June 3, 1958  E. KOCH  2,836,938
OPERATION CONTROL ARRANGEMENT FOR MACHINE TOOLS
Filed March 9, 1955  2 Sheets-Sheet 1

Inventor:
Erich Koch
By:
Michael S. Striker
agt.

June 3, 1958  E. KOCH  2,836,938
OPERATION CONTROL ARRANGEMENT FOR MACHINE TOOLS
Filed March 9, 1955  2 Sheets-Sheet 2

Inventor:
Erich Koch
By:
Michael S. Striker
agt.

United States Patent Office 2,836,938
Patented June 3, 1958

2,836,938

OPERATION CONTROL ARRANGEMENT FOR MACHINE TOOLS

Erich Koch, Berlin-Charlottenburg, Germany, assignor to Firma Jung Schleifmaschinen H. Gaub, Berlin-Tempelhof, Germany Application March 9, 1955, Serial No. 493,273

Claims priority, application Germany March 19, 1954

11 Claims. (Cl. 51—95)

The present invention relates to an operation control arrangement for machine tools, and more particularly to an operation control arrangement for selectively operating a plurality of operation control means.

It is frequently necessary to initiate automatic control movements of machine tools from a movable machine part, such as a reciprocating carriage. For this purpose adjustable actuating members are provided on the movable carriage which actuate operation control members such as distributing valves controlling hydraulic operations.

However, the known arrangements of this type have certain disadvantages, for instance, an actuating member mounted on a reciprocating carriage may actuate the operation control means associated therewith twice during one traverse, although the operation of the operation control member may only be required after several traverses of the carriage.

It is the object of the present invention to overcome the disadvantages of the known operation control arrangements, and to provide an operation control arrangement permitting selective operation of operation control means.

It is another object of the present invention to provide control means for selectively controlling a plurality of operation control means.

It is a further object of the present invention to obtain a selective control action regardless of the arrangement of the actuating means on a movable machine part.

It is yet an object of the present invention to actuate operation control means by the sudden impact of a ramming projection.

It is also an object of the present invention to provide in the operation control arrangement means for automatical and manual shifting means.

With the above objects in view the present invention mainly consists in an operation control arrangement for auxiliary devices for a machine tool having a carriage and comprises, in combination, operating means movable between a retracted position and an advanced position and being shiftable between a coupling position and an inoperative position; carriage controlled means and manually operated means for selectively shifting the operating means between the inoperative and coupling positions; movable actuating means engaging during movement thereof the operating means for shifting the same from the retracted position to the advanced position; and operation control means for auxiliary devices and actuated by the operating means when the same in the coupling position of the same are moved by the actuating means from the retracted position to the advanced position.

According to a preferred embodiment of the present invention a plurality of operating means including push rods are provided, each push rod being movable in longitudinal direction between a retracted position and an advanced position and being shiftable in a transverse direction between a coupling and an inoperative position. A connecting linkage connects the operating means so that the same are simultaneously shifted between inoperative and coupling positions. According to a preferred embodiment of the present invention the connecting linkage can be turned between one position in which one operating means is operative and the other inoperative, another position in which the other operating means is operative, and the first operating means is inoperative, and a third position in which both operating means are inoperative.

When the push rods are longitudinally shifted to advanced positions by actuating means secured to a reciprocating carriage, operating means in operative position shift operation control means associated therewith, for instance a hydraulic valve means controlling the hydraulic system of a movable part of the machine tool.

The linkage is either operated by manually operated means or by an automatic mechanism actuated by an actuating means attached to the movable carriage of the machine tool.

This arrangement achieves not only a selective control action, but also permits the arrangement of the actuating means on the carriage wherever there is sufficient space which is a particular advantage in automatic machine tools which in conventional arrangements frequently necessitate an accumulation of control members at certain points so that these members cannot be arranged adjacent each other on a rail of the carriage at such spacing as is required by their control timing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
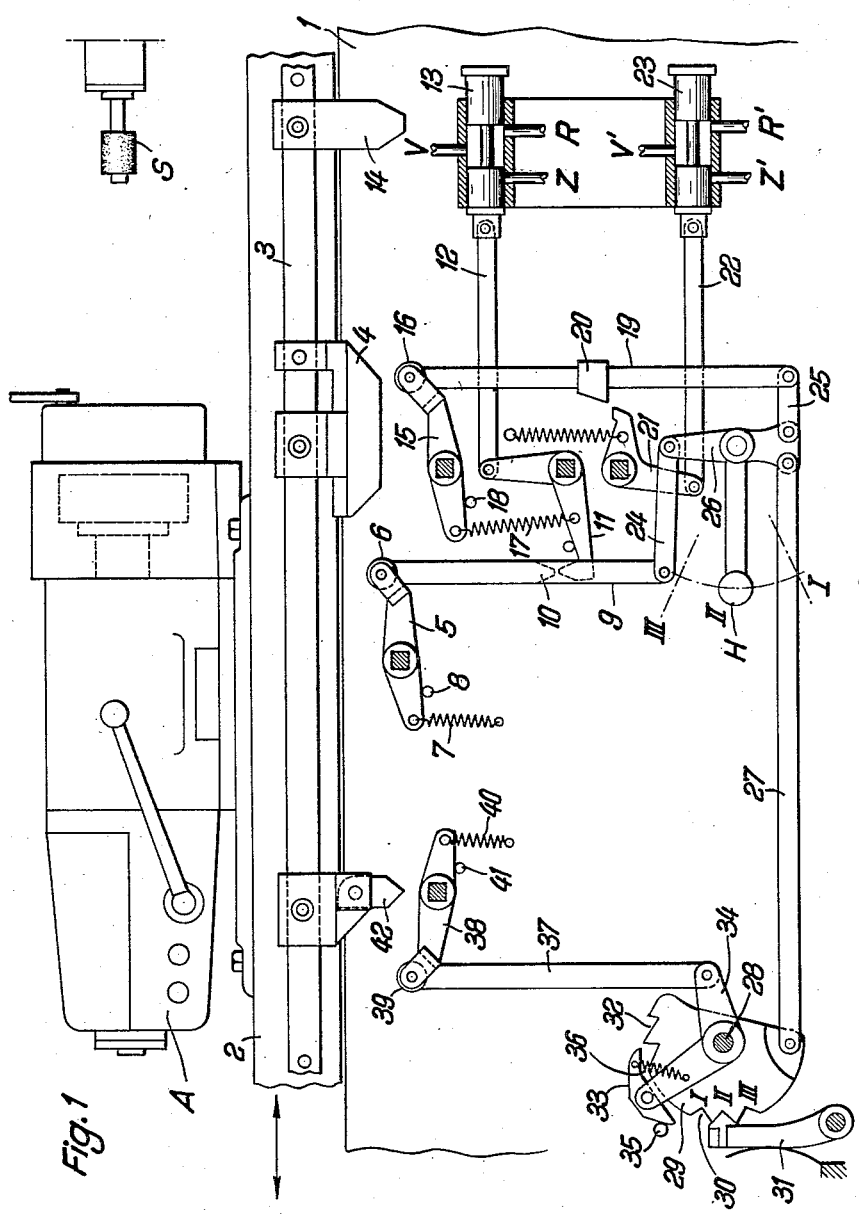
Fig. 1 is a front view illustrating a preferred embodiment of the present invention.

Referring now to the drawings, and more particularly to Fig. 1, on the frame 1 of the machine tool, which is illustrated as an internal grinding machine, a carriage 2 is reciprocably mounted and carries a supporting means for holding a workpiece. The carriage 2 is reciprocated in a conventional manner by hydraulic drive means so as to be moved toward and away from the grinding wheel S. A movement of the carriage is required for advancing and retracting the workpiece, for moving the workpiece during roughing or finishing operations, and for a trueing movement of a dressing tool which is supported on the supported A. The conventional reversing dogs, not shown in the drawings, are provided for reversing the carriage 2.

According to the present invention, actuating means are adjustably secured to a rail 3 which is attached to the reciprocating carriage 2. According to the positions of these actuating means, operation control members, such as hydraulic distributing slide valves are operated which actuate auxiliary devices associated with the operation of the machine. For instance, a trueing device for the grinding wheel, a cross feed means, a gauge device, and other auxiliary devices may be operated. The operation control means, for the auxiliary devices are illustrated in Fig. 1 to include slide valves 13 and 23 movable between two control positions for connecting supply pipes Z and Z', respectively, and return pipes R and R', respectively, to distributing pipes V and V', respectively. The distributing pipes are connected to hydraulic means for operating auxiliary devices associated with the machine tool.

One actuating means 4 cooperates with a double-armed lever 5 which is pivotally mounted on the machine frame and carries at one end thereof a cam follower 6 cooperating with the cam face of the actuating means 4. A spring 7 urges the lever 5 into the path of the actuating means 4, and a stop 8 limits turning movement of the lever 5 under the action of the spring 7. A push rod 9 is pivotally connected at one end thereof to the end of lever 5 which carries the cam follower 6. Intermediate the ends of the push rod 9, a ramming projection 10 is provided on one side face of the push rod 9 which, when the push rod is moved in longitudinal direction from the retracted position shown in Fig. 1 to an advanced position, cooperates with the free arm of a bell crank lever 11 for effecting turning movement of the same. The push rod 9 is shifted in longitudinal direction when the actuating means 4 engages the cam follower 6, and as the push rod 9 moves to its advanced position, it exerts through projection 10 a sudden impact on the shifting member 11.

The other arm of the bell crank lever 11 is connected by a connecting rod 12 to the valve piston of the operation control valve means 13. The spring 17 urges the shifting member 11 against a stop and in this position, the operation control means 13 is in one control position. When the push rod 9 moves to its advanced position, the operation control means 13 is shifted to its other control position. The illustrated control valve 13 may be replaced by any other suitable operation control means, such as a shiftable dog, pawl, lever and so forth.

The lever 5 and the push rod 9 constitute operating means for operating the operation control means.

Another actuating means 14 is adjustably mounted on the rail 3 of the carriage 2 spaced a selected distance from the actuating means 4. The actuating means 14 cooperates with a double-armed pivoted lever 15 carrying a cam follower 16 and pivotally connected to a push rod 19 which is provided with a ramming projection 20. A stop 18 defines one position of the lever 15 into which it is urged by the spring 17, and in this position the push rod 19 is retracted and the cam follower 16 located in the path of the actuating means 14, but outside of the path of the actuating means 4. When the actuating means 14 engages the cam follower 16 and moves the push rod 19 from the retracted position illustrated in Fig. 1 to an advanced position, the ramming projection 20 moves past the free end of the spring loaded pivoted shifting member 21 since in Fig. 1 the push rod 19 is shown in an inoperative position. The other end of the shifting member 21 is connected by a connecting rod 22 to the operation control valve means 23 and shifts the same, when actuated by the projection 20 in an operative coupling position of push rod 19.

The push rods 9 and 19 are pivotable about the upper ends thereof which are connected to the levers 5 and 15. Consequently, the push rod 9 can be pivoted from the operative coupling position shown in Fig. 1 to an inoperative position shown in Fig. 2 in which the projection 10 will not engage the shifting member 11 when the push rod 9 is longitudinally shifted by the actuating means 4 to an advanced position.

Figure 3:
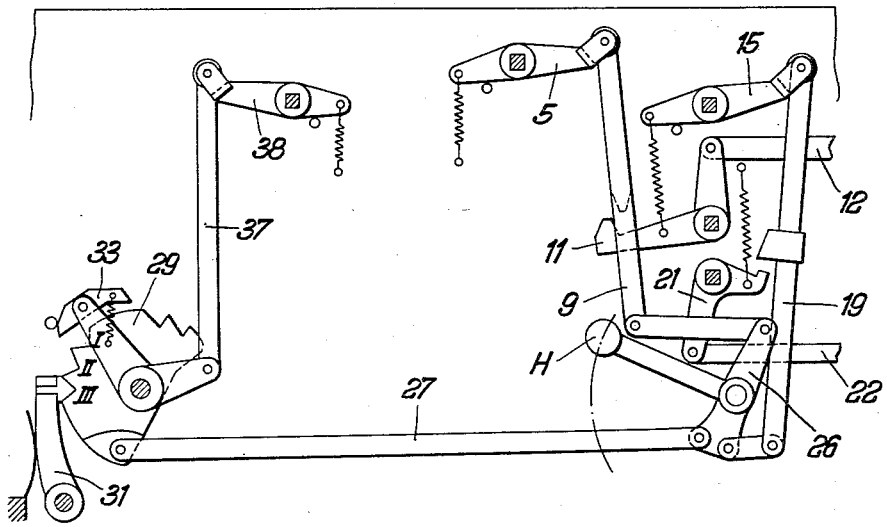
Fig. 3 is a fragmentary front view showing the arrangement of Fig. 1 in a third position.

Similarly, the push rod 19 which is shown in Fig. 1 in an inoperative position, can be pivoted in a transverse direction into the coupling position shown in Fig. 3 in which the ramming projection 20 engages the shifting member 21 during movement of the push rod 19 in longitudinal direction to an advanced position.

According to the present invention control means are provided for simultaneously and selectively shifting the push rods 9 and 19 between the operative and inoperative positions thereof. A double-armed linkage lever 26 is pivotally mounted on the frame of the machine and is pivotally connected at one end thereof by a link 24 to the lower end of push rod 9, and by a link 25 to the lower end of push rod 19. A manually operable handle means H is connected to the linkage lever 26 for turning movement therewith, and may be turned between three three positions indicated by the numerals I, II and III, which correspond to selected positions of the operating means 5, 9, 10 and 15, 19, 20, as will be described hereinafter in greater detail.

A connecting rod 27 is connected at one end thereof to the lever 26 and at the other end thereof to a segment-shaped control member 29 which is turnably mounted on a shaft 28 which is supported on the machine frame. Resilient catch means 31 cooperate with three recesses designated I, II, III in the segment-shaped control member 29 for holding the same in three positions corresponding to the positions of the manually operated handle H.

On shaft 28, a bell crank lever 34 is turnably mounted and pivotally supports at one end thereof a pawl 33 which is urged by a spring 36 into a position engaging the ratchet teeth 32 on the segment-shaped control member 29. In the position illustrated in Fig. 1, a stop 35 holds the pawl 33 in a position releasing the ratchet teeth 32 so that the turning of the manually operated means H in opposite directions is possible. The other end of the bell crank lever 34 is pivotally connected to one end of a rod 37, the other end of which is pivoted to a double-armed lever 38. Lever 38 is urged by a spring 40 into a position engaging the stop 41 in which the cam follower 39 is located in the path of movement of an actuating means 42. Actuating means 42 is pivotally mounted on a support carried by the rail 3. The actuating lug 42 is rigid in one direction, but turnable in the other direction. Consequently, when the carriage 2 moves to the left in Fig. 1, the cam follower 39 is downwardly urged by a cam face on the actuating lug 42, while during movement of the carriage 2 to the right in Fig. 1 the lug 42 turns, and the rod 37 is not shifted.

When the rod 37 is pushed by lug 42 to an advanced position, the bell crank lever 34 is turned clockwise in Fig. 1, and the ratchet pawl 33 moves away from the stop 35 and is urged by the spring 36 to engage the respective ratchet tooth 32 which is located opposite its free end. Further turning of the bell crank lever 34 results in shifting of the control member 29 to its next following position. After that, the lug 42 has passed over the cam follower 39 and the spring 40 retracts the rod 37 and thereby returns the ratchet pawl means 33, 34 to the position illustrated in Fig. 1 in which the pawl 33 releases the ratchet teeth 32 due to the action of the stop 35. In this position, manual turning of linkage lever 26 in opposite directions is possible.

It will be understood that the arrangement of the linkage means 24, 25, 26 connecting the push rods 9 and 19 may be adapted to obtain different sequences of operations of the operation control means 13 and 23. In the illustrated embodiment, the control sequence is so selected that the push rods 9 and 19 are shiftable between two positions in which the control movement is transferred to one or the other of the operation control means 13, 23, and a third position in which none of the operation control means 13, 23 is operated. Operation in accordance with this sequence is automatically obtained during carriage movement, but due to the fact that pawl 33 normally does not lock or engage control member 29, any other sequence can be obtained by operation of handle H.

In the illustrated embodiment, the following three control positions may be obtained by manual operation of the handle H, or by automatic operation by the control means 29, 33, 34, 37, 38, 39, 42.

Figure 2:
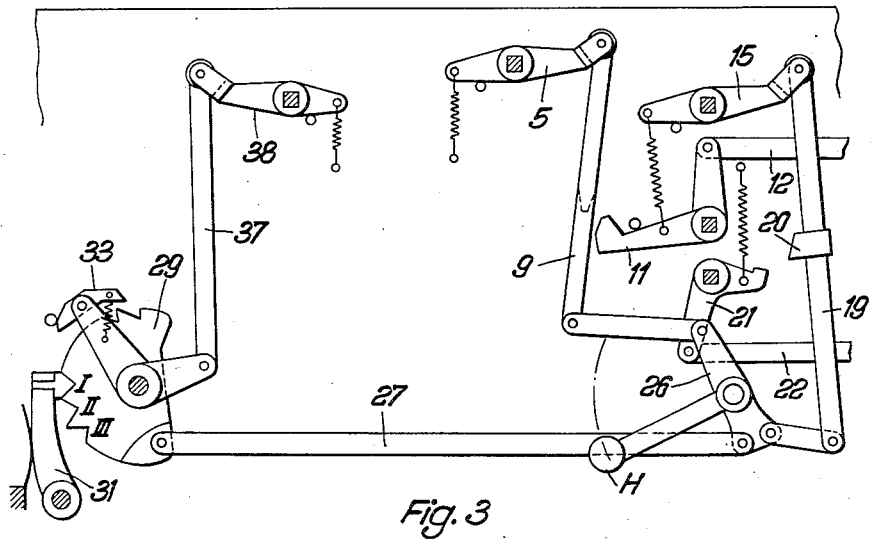
Fig. 2 is a fragmentary front view showing the arrangement of Fig. 1 in a different position.

In the position I illustrated in Fig. 2, the operating means, and more particularly the push rods 9 and 19 are shifted to the inoperative positions thereof so that longitudinal movement of the push rods to an advanced position due to engagement by the actuating means 4, 14 will be ineffective since the ramming projections 10 and 20 move past the shifting members 11 and 21, respectively.

In the position II, illustrated in Fig. 1, the push rod 9 is in its operative coupling position and the push rod 19 is in its inoperative position. Consequently, the operation control means 13 will be actuated when the ramming projection 10 hits the shifting member 11 during movement of the push rod 9 to its advanced position. The ramming projection 20 is ineffective since it passes the shifting member 21 during the advance movement of the push rod 19.

In the position III, illustrated in Fig. 3, the ramming projection 20 engages the shifting member 21 since the push rod 19 is shifted to its operative position. The push rod 9 is in an inoperative position and does not shift the shifting member 11 during movement to its advanced position.

It will be understood that each of the elements described above, or two or more together, may also find a useful application in other types of operation control arrangements differing from the types described above.

While the invention has been illustrated and described as embodied in an operation control arrangement for selectively actuating operation control means of a machine tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine tool including auxiliary devices for performing different operations of the machine tool, a control apparatus for controlling the auxiliary devices, comprising, in combination, a support; a carriage movably mounted on said support; first actuating means mounted on said carriage for movement therewith; a plurality of operation control means respectively associated with said auxiliary devices, each operation control means being movable to an actuated position for actuating the respective associated auxiliary device; a plurality of operating means respectively associated with said operation control means and said auxiliary devices, each operating means being mounted on said support movable in one direction between a retracted position and an advanced position, and shiftable in a transverse direction between an inoperative position and a coupling position, each of said operating means being engaged by said first actuating means during carriage movement and moved by the same to said advanced position, and operating means in said coupling position engaging the associated operation control means during movement to said advanced position and shifting the same to said actuated position; a connecting linkage mounted on said support movable between a plurality of positions, and shifting during movement between said positions at least one of said operating means between said inoperative and coupling positions; a control mechanism mounted on said support movable between a plurality of control positions and being connected to said linkage for shifting the same between said positions of the same; second actuating means mounted on said carriage for movement therewith and actuating during carriage movement said control mechanism to consecutively move to said control positions whereby said operation control means are actuated in a predetermined sequence; and manually operated means connected to said linkage for moving the same between said positions of the same independently upon said control mechanism whereby said predetermined sequence of actuations of said operation control means can be replaced by a desired sequence of actuations selected by operation of said manually operated means.

2. In a machine tool including auxiliary devices for performing different operations of the machine tool, a control apparatus for controlling the auxiliary devices, comprising, in combination, a support; a carriage movably mounted on said support; first actuating means mounted on sad carriage for movement therewith; a plurality of operation control means respectively associated with said auxiliary devices, each operation control means being movable to an actuated position for actuating the respective associated auxiliary device; a plurality of operating means respectively associated with said operation control means and said auxiliary devices, each operating means being mounted on said support movable in one direction between a retracted position and an advanced position, and shiftable in a transverse direction between an inoperative position and a coupling position, each of said operating means being engaged by said first actuating means during carriage movement and moved by the same to said advanced position, and operating means in said coupling position engaging the associated operation control means during movement to said advanced position and shifting the same to said actuated position; a connecting linkage mounted on said support movable between a plurality of positions, and shifting during movement between said positions at least one of said operating means between said inoperative and coupling positions; a control mechanism mounted on said support and including a control member connected to said linkage for turning movement therewith and being turnable between a plurality of control positions for shifting said linkage between said positions of the same, said control member having a plurality of ratchet teeth, said control mechanism including a shiftable ratchet pawl means cooperating with said ratchet teeth for shifting said control member between said positions of the same; second actuating means mounted on said carriage for movement therewith and engaging and actuating during carriage movement said ratchet pawl means for turning said control member to consecutively move to said control positions whereby said operation control means are actuated in a predetermined sequence; and manually operated means connected to said linkage for moving the same between said positions of the same independently upon said control mechanism whereby said predetermined sequence of actuations of said operation control means can be replaced by a desired sequence of actuations selected by operation of said manually operated means.

3. A control apparatus as set forth in claim 2 wherein said ratchet pawl means includes a pawl mounted on said support turnable between an operative position engaging said ratchet teeth and a position releasing said ratchet teeth, a cam follower means connected to said ratchet pawl and engaged by said second actuating means, spring means urging said pawl into said operative position, and stop means for holding said pawl in said releasing position, said stop means releasing said pawl when same is shifted by said cam follower means upon engagement by said second actuating means.

4. In a machine tool including auxiliary devices for performing different operations of the machine tool, a control apparatus for controlling the auxiliary devices, comprising, in combination, a support; a carriage movably mounted on said support; first actuating means mounted on said carriage for movement therewith; a plurality of operation control means respectively associated with said auxiliary devices, each operation control means being movable to an actuated position for actuating the respective associated auxiliary device; a plurality of operating means respectively associated with said operation control means and said auxiliary devices, each operating means being mounted on said support movable in one direction between a retracted position and an advanced position, and shiftable in a transverse direction between an inoperative position and a coupling position, each of said operating means being engaged by said first actuating means during carriage movement and moved by the same to said advanced position, and operating means in said coupling position engaging the associated operation control means during movement to said advanced position and shifting the same to said actuated position; resilient means urging said operating means to move to said retracted position; a connecting linkage mounted on said support movable between a plurality of positions, and shifting during movement between said positions at least one of said operating means between said inoperative and coupling positions; a control mechanism mounted on said support and including a control member connected to said linkage for turning movement therewith and being turnable between a plurality of control positions for shifting said linkage between said positions of the same, said control member having a plurality of ratchet teeth, said control mechanism including a shiftable ratchet pawl means cooperating with said ratchet teeth for shifting said control member between said positions of the same; catch means for holding said control member releasably in said control positions; second actuating means mounted on said carriage for movement therewith and engaging and actuating during carriage movement said ratchet pawl means for turning said control member to consecutively move to said control positions whereby said operation control means are actuated in a predetermined sequence; and manually operated means connected to said linkage for moving the same between said positions of the same independently upon said control mechanism whereby said predetermined sequence of actuations of said operation control means can be replaced by a desired sequence of actuations selected by operation of said manually operated means.

5. In a machine tool including auxiliary devices for performing different operations of the machine tool, a control apparatus for controlling the auxiliary devices, comprising, in combination, a support; a carriage movably mounted on said support; a plurality of first actuating means mounted on said carriage for movement therewith, each first actuating means moving along a different path and being associated with a different auxiliary device; a plurality of operation control means respectively associated with said auxiliary devices, each operation control means being movable to an actuated position for actuating the respective associated auxiliary device; a plurality of operating means respectively associated with said operation control means and said auxiliary devices, each operating means being mounted on said support movable in one direction between a retracted position and an advanced position, and shiftable in a transverse direction between an inoperative position and a coupling position, each of said operating means being associated with, located in the path of, and engaged by one of said first actuating means during carriage movement and moved by the same to said advanced position, and operating means in said coupling position engaging the associated operation control means during movement to said advanced position and shifting the same to said actuated position; a connecting linkage mounted on said support movable between a plurality of positions, and shifting during movement between said positions at least one of said operating means between said inoperative and coupling positions; a control mechanism mounted on said support movable between a plurality of control positions and being connected to said linkage for shifting the same between said positions of the same; second actuating means mounted on said carriage for movement therewith and actuating during carriage movement said control mechanism to consecutively move to said control positions whereby said operation control means are actuated in a predetermined sequence; and manually operated means connected to said linkage for moving the same between said positions of the same independently upon said control mechanism whereby said predetermined sequence of actuations of said operation control means can be replaced by a desired sequence of actuations selected by operation of said manually operated means.

6. In a machine tool including auxiliary devices for performing different operations of the machine tool, a control apparatus for controlling the auxiliary devices, comprising, in combination, a support; a carriage movably mounted on said support; a plurality of first actuating means mounted on said carriage for movement therewith, each first actuating means moving along a different path and being associated with a different auxiliary device; a plurality of operation control means respectively associated with said auxiliary devices, each operation control means being movable to an actuated position for actuating the respective associated auxiliary device; a plurality of operating means respectively associated with said operation control means and said auxiliary devices, each operating means including a pivotally mounted lever and a push rod pivotally connected at one end thereof to said lever, said push rod being movable in longitudinal direction thereof together with said lever between a retracted position and an advanced position and being pivotable about said pivoted end thereof between a coupling position and an inoperative position, each of said levers being located in the path of one of said first actuating means and being engaged by the same during carriage movement for moving the respective push rod to said advanced position, and said push rods in said coupling position engaging the associated operation control means during movement to said advanced position and shifting the same to said actuated position; a connecting linkage mounted on said support movable between a plurality of positions, and shifting during movement between said positions at least one of said operating means between said inoperative and coupling positions; a control mechanism mounted on said support movable between a plurality of control positions and being connected to said linkage for shifting the same between said positions of the same; second actuating means mounted on said carriage for movement therewith and actuating during carriage movement said control mechanism to consecutively move to said control positions whereby said operation control means are actuated in a predetermined sequence; and manually operated means connected to said linkage for moving the same between said positions of the same independently upon said control mechanism whereby said predetermined sequence of actuations of said operation control means can be replaced by a desired sequence of actuations selected by operation of said manually operated means.

7. An apparatus as set forth in claim 6 wherein said operation control means respectively include pivoted shifting members located in the path of advancing movement of said push rods when the respective push rod is in said coupling position.

8. An apparatus as set forth in claim 6 wherein said control mechanism includes a turnable ratchet wheel connected to said linkage, a ratchet pawl for shifting said ratchet wheel, and a lever connected to said ratchet pawl for actuating the same and being engaged by said second actuating means during movement of the carriage.

9. An apparatus as set forth in claim 1 wherein said linkage includes a linkage lever turnable between three positions, and holding in one of said positions at least one of said operating means in said inoperative position and another of said operating means in said coupling position, said linkage lever holding in another position said other operating means in said inoperative position, and said one operating means in said coupling position, and holding in the third position said one and said other operating means in said inoperative positions.

10. An apparatus as set forth in claim 6 wherein said linkage includes a linkage lever turnable between three positions and holding in one of said positions at least one of said push rods in said inoperative position and another of said push rods in coupling position, said linkage lever holding in another position said other push rod in said inoperative position and said one push rod in said coupling position, and holding in the third position said one push rod and said other push rod in said inoperative positions.

11. In a machine tool including auxiliary devices for performing different operations of the machine tool, a control apparatus for controlling the auxiliary devices, comprising, in combination, a movable carriage; operating means movable in one direction between a retracted position and an advanced position and being shiftable in a transverse direction between a coupling position and an inoperative position; carriage controlled means and manually operated means for selectively shifting said operating means between said inoperative and coupling position; actuating means on said carriage engaging during carriage movement said operating means for shifting the same from the retracted position to said advanced position, and engaging said carriage controlled means for selectively shifting said operating means to said coupling position; and operation control means for the auxiliary devices and being connected to and actuated by said operating means when the same in said coupling position are moved from said retracted position to said advanced position by said actuating means.

References Cited in the file of this patent

UNITED STATES PATENTS 2,092,215     Jung _____ Sept. 7, 1937

FOREIGN PATENTS 718,494     Germany _____ Mar. 13, 1942